United States Patent
Yamada et al.

(10) Patent No.: US 8,774,550 B2
(45) Date of Patent: Jul. 8, 2014

(54) PICTURE PROCESSING DEVICE, PICTURE PROCESSING METHOD, INTEGRATED CIRCUIT, AND PROGRAM

(75) Inventors: Hitoshi Yamada, Osaka (JP); Jun Ohmiya, Kyoto (JP)

(73) Assignee: Panasonic Corporation, Osaka (JP)

( * ) Notice: Subject to any disclaimer, the term of this patent is extended or adjusted under 35 U.S.C. 154(b) by 176 days.

(21) Appl. No.: 13/388,355

(22) PCT Filed: Jun. 2, 2011

(86) PCT No.: PCT/JP2011/003101
§ 371 (c)(1),
(2), (4) Date: Feb. 1, 2012

(87) PCT Pub. No.: WO2011/152053
PCT Pub. Date: Dec. 8, 2011

(65) Prior Publication Data
US 2012/0134596 A1    May 31, 2012

(30) Foreign Application Priority Data
Jun. 4, 2010  (JP) .................................. 2010-129436

(51) Int. Cl.
*G06K 9/40* (2006.01)
(52) U.S. Cl.
USPC ...................................................... 382/266
(58) Field of Classification Search
None
See application file for complete search history.

(56) References Cited

U.S. PATENT DOCUMENTS

| 6,856,696 | B1 | 2/2005 | Ajioka | |
| 2004/0239779 | A1 | 12/2004 | Washisu | |
| 2009/0109304 | A1 | 4/2009 | Guan | |
| 2009/0290809 | A1* | 11/2009 | Yamada | 382/266 |
| 2010/0238320 | A1 | 9/2010 | Washisu | |
| 2011/0129167 | A1* | 6/2011 | Nojima et al. | 382/266 |

FOREIGN PATENT DOCUMENTS

| JP | 2001-148023 | 5/2001 |
| JP | 2002-298137 | 10/2002 |
| JP | 2004-357071 | 12/2004 |
| JP | 2006-50070 | 2/2006 |
| JP | 2009-110137 | 5/2009 |
| WO | 2009/001510 | 12/2008 |

OTHER PUBLICATIONS

International Search Report issued Sep. 6, 2011 in corresponding International Application No. PCT/JP2011/003101.

* cited by examiner

*Primary Examiner* — Stephen R Koziol
*Assistant Examiner* — Delomia Gilliard
(74) *Attorney, Agent, or Firm* — Wenderoth, Lind & Ponack, L.L.P.

(57) ABSTRACT

A picture processing device (100) includes: a mask generation unit (110x) which generates a masking picture (110aI) based on an edge in a first picture (101a); a feature point masking unit (111x) which masks extracted feature points with the generated masking picture (110aI); a rotation matrix calculation unit (112) which calculates a positional change between the first picture and a second picture (101a, 101b) using a feature point selected from the feature points as a result of the masking; and a picture correction unit (113) which uses the calculated change.

9 Claims, 10 Drawing Sheets

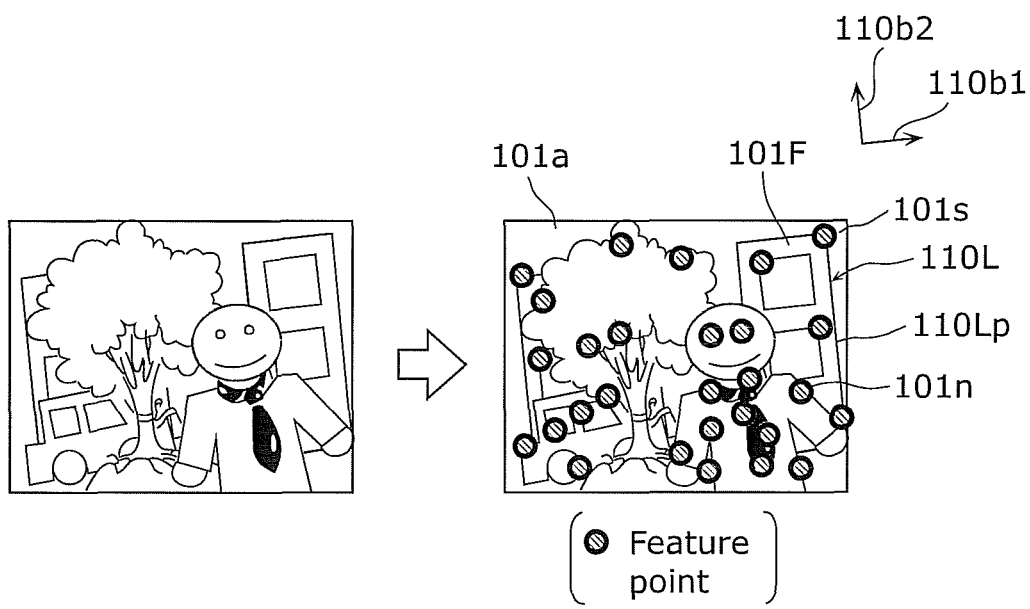

|    |   |   |
|----|---|---|
| -1 | 0 | 1 |
| -2 | 0 | 2 |
| -1 | 0 | 1 |

PICTURE PROCESSING DEVICE, PICTURE PROCESSING METHOD, INTEGRATED CIRCUIT, AND PROGRAM

TECHNICAL FIELD

The present invention relates to a technique to correct pictures captured by a digital still camera, a video camera, a wearable camera, and the like.

BACKGROUND ART

In some conventional methods of correcting blur due to camera shake, the amount of camera blur between frames is estimated by using a technique of estimating a motion vector using two pictures so that the blur due to camera shake can be corrected. A Moving Picture Experts Group (MPEG) technique is representative of such a technique.

In this method, a picture is divided into rectangular regions, and the amount of motion between frames is calculated for each of the regions. The amount of motion of the whole picture is estimated from motion vectors of the respective regions so that the picture can be finally corrected. Such a method performed using motion vectors has problems in accuracy and computational cost because of the nature of algorithm. This limits the magnitude of maximum detectable blur due to camera shake. There is a trade-off between the magnitude of maximum detectable blur due to camera shake and the computational cost. The larger the magnitude of maximum detectable blur due to camera shake, the higher the computational cost. Thus, the magnitude of maximum detectable blur due to camera shake is usually determined based on assumed magnitude of blur due to camera shake. In order to detect large blur due to camera shake using the method, a range of detectable blur due to camera shake needs to be wide. On the other hand, the range coincides with a solution space. That is, the wider the range is, the more probable it is that an obtained solution results in a local solution. In this case, blurs are not detected with sufficient accuracy, and the magnitude of blurs in pictures taken during walking or without using a finder cannot be supported.

On the other hand, there is a method of correcting blur which is too large to correct using motion vectors. In this method, blur is corrected based on feature point matching. Unlike the method using motion vectors which are information of respective regions, the method is performed using several points on objects which are present in both two pictures taken consecutively. Among the points, the one which is in both of the two pictures and detectable by picture processing is referred to as a feature point. The feature-point-based matching is a method in which a motion between two pictures is estimated by matching feature points between frames. A rotation matrix representing the amount of blur can be estimated by the matching, and the blur is corrected using the rotation matrix.

In the feature-point-based matching, the magnitude of blur due to camera shake is usually unknown and no information on the object in the picture is available. It is therefore impossible to determine in advance which of the feature points can be used to make an accurate estimation of blur due to camera shake.

An appropriate combination of feature points is determined by an exhaustive search using a method such as a RANdom SAmple Consensus (RANSAC). Then, the amount of blur is estimated usually using a pair of feature points (inliers) determined as the most suitable combination by a preset evaluation function.

In such feature-point-based matching, feature points are matched based on similarity between two frames. The size of a solution space therefore depends on the number of the feature points. Accordingly, this method does not require a high computational cost and the probability that an obtained solution results in a local solution is low compared to the method in which information on respective regions, that is, a motion vector is used, even when a range of detectable blur due to camera shake is wide.

Therefore, feature-point-based matching allows estimation of large blur due to camera shake in pictures taken during walking or without using a finder.

However, in the feature-point-based matching, a feature point to be used for estimation of the amount of blur needs to be the one obtained from a distant view region of a picture. This is a problem equivalent to the problem what is used as a reference for correcting blur due to camera shake.

In other words, a camera moves not with respect to an object but with respect to a distant view (background). It is therefore preferable to correct blur due to camera shake with reference to the distant view. It is for this reason that a feature point to be used is preferably the one in a distant view region.

The point is that blur remains in a picture corrected based on matching with reference to a close object such as a passerby, but the picture looks as if there was not the blur due to camera shake when matching is performed with reference to a distant view.

It should be noted that when a picture is divided into a near view region and a distant view region, the distant view region is a region showing an object relatively distant from the camera. For example, in a picture showing objects such as a person and a building or nature (trees, for example), the region showing the image of the person is a near view region, and the region showing the image of the building or the nature.

CITATION LIST

Patent Literature

[PTL 1] Japanese Unexamined Patent Application Publication Number 2009-110137
[PTL 2] Japanese Unexamined Patent Application Publication Number 2001-148023
[PTL 3] Japanese Unexamined Patent Application Publication Number 2002-298137

SUMMARY OF INVENTION

Technical Problem

As mentioned above, in the feature-point-based matching, a feature point obtained from a distant view region is necessary to make a successful estimation of the amount of blur.

However, it is impossible to determine in advance which region in a picture is a near view region and which is a distant view region, unless using a special distance measuring apparatus or a compound-eye system.

There are also methods of determining a distance from a camera for each region by picture processing. PTL 1 discloses a technique in which focal lengths are switched from one to another before encoding of a picture. PTL 2 and PTL 3 each disclose a technique in which an encoded picture is divided into a plurality of picture regions, and difference in luminance values and edge information is obtained for comparison so that the distance from the camera is determined for the respective regions.

However, there is still a problem in accuracy even when a distance from a camera is obtained for respective regions and matching is performed on feature points distinguished based on whether it is in a near view region or a distant view region as in these techniques. For this reason, there is still a possibility that blur estimation results in failure.

Again, a feature point to be used is preferably the one in a distant view region because correction is performed with reference to the distant view region.

However, in order to allow an estimation of the amount of blur, the distant view region needs to satisfy a condition that the region has few interframe motions or a condition that motions in the region are very small and in a uniform distance.

For example, such conditions for a successful estimation of the amount of blur are not satisfied when the feature point extracted is located in a distant view region showing small motions but the region is of an image of trees swayed by wind so that the motions are not in a uniform direction.

In this case, the amount of blur cannot be accurately estimated because the information used for the estimation is about motions unrelated to the motion of the camera.

Such unsuccessful estimation of the amount of blur as in this example is noticeable in scenes in which many natural objects are included in a distant view region. This is a problem due to a distant view including natural objects, and the problem cannot be solved by the conventional techniques.

The problem to be solved by the present invention is the difficulty in accurate matching performed by the conventional methods of feature-point-based matching on a picture including a near view region occupying a large proportion of the picture or a picture including many natural objects in a distant view region. In other words, the present invention has an object of providing a picture processing device which is capable of accurate matching on such pictures.

Solution to Problem

Provided in order to solve the problem is a picture processing device according to an aspect of the present invention which includes: a picture obtainment unit configured to obtain a first picture and a second picture, the first picture being taken before the second picture is taken; a feature point extraction unit configured to extract feature points from the first picture and feature points from the second picture; a masking picture generation unit configured to generate a masking picture based on edges in the first picture; a feature point masking unit configured to mask the feature points of the first picture extracted by the feature point extraction unit, with the masking picture generated by the masking picture generation unit; a calculation unit configured to calculate a positional relationship between the first picture and the second picture based on the feature point (see a position $101s$) specified from the feature points (see the position $101s$ and a position $101n$ in FIG. 13, for example) as a result of the masking by the feature point masking unit and the extracted feature points of the second picture; and a picture correction unit configured to correct one of the first picture and the second picture based on the positional relationship calculated by the calculation unit.

Advantageous Effects of Invention

The picture processing device according to an aspect of the present invention is capable of matching using a structural object region (see a region $101F$ in FIG. 2), which is one of regions satisfying a condition for successful estimation the amount of blur, and therefore estimation of the amount of blur is accurately estimated so that the blur can be corrected even for a picture including a near view region occupying a large proportion of the picture or a picture including many natural objects in a distant view region.

With this, a motion of an imaging unit (see a motion $101m$ in FIG. 13) can be determined with higher accuracy and a higher success rate.

Here, a structural object refers to an object of a geometric structure such as a building, a pillar, or a window. For such a structural object, the condition that the region has few interframe motions or the condition that motions in the region are very small and in a uniform distance is satisfied. In addition, a structural object has a characteristic that edges in a picture are likely to be present on a specific line segment of the structural object due to the geometric structure.

BRIEF DESCRIPTION OF DRAWINGS

FIG. 2 shows examples of extracted feature points.

FIG. 3A shows a Sobel filter.

FIG. 13 shows a picture processing device and the like.

DESCRIPTION OF EMBODIMENTS

Embodiments of the present invention shall be described below with reference to the drawings.

Figure 13:
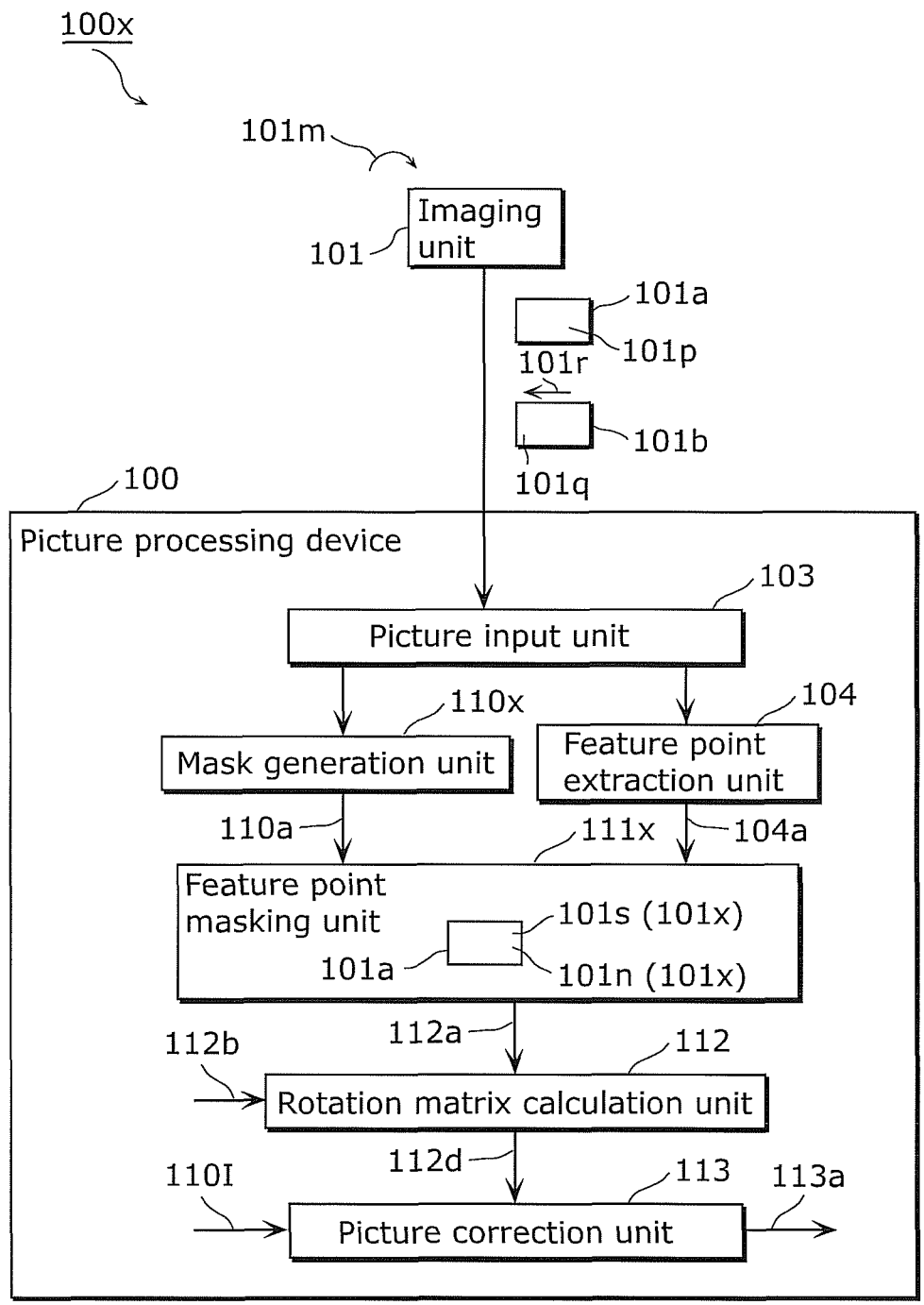

A picture processing device (a picture processing device 100, a system $100x$) according to the embodiments includes a picture input unit 103 (FIG. 13, FIG. 1, for example) which obtains a first picture $101a$ and a second picture $101b$ (FIG. 13). The first picture $101a$ is taken before the second picture $101b$. The picture processing device further includes a feature point extraction unit 104 which extracts feature points from the first picture $101a$ and the second picture $101b$ which the picture input unit 103 has obtained (for example, a feature point located at a position $101x$ in the first picture $101a$ (FIG. 13)). The picture processing device further includes a mask generation unit $110x$ which generates a mask picture (a picture (masking picture) $110aI$ in FIG. 7) based on an edge in the first picture $101a$ (see an edge on a straight line $110L$ in FIG. 2, for example). The masking picture is determined by a masking region including points on a straight line, such as the straight line 110L. The picture processing device further includes a feature point masking unit 111x which masks the feature points (at the position 101x) extracted from the first picture 101a by the feature point extraction unit 104, with the mask picture (the picture 110aI) generated by the mask generation unit 110x so that a feature point (a feature point at a position 101s (see FIG. 13)) on the straight line (the straight line 110L) is specified. The picture processing device further includes a rotation matrix calculation unit 112 which calculates data (see a rotation matrix described later) indicating a positional relationship (positional change 101r) between the first picture 101a and the second picture 101b, based on the feature points (the feature point at the position 101s, a feature point at a first position 101p (see FIG. 13)) specified from two or more feature points (two or more positions 101x (see FIG. 13, for example)) and the feature point extracted from the second picture 101b (a feature point at a second position 101q). The picture processing device further includes a picture correction unit 113 which corrects a picture 110I, which is one of the first picture 101a and the second picture 101b (for example, the second picture 101b), to generate a corrected picture 113a, using the positional relationship (the positional change 101r) calculated by the rotation matrix calculation unit 112. In the corrected picture 113a, the feature points are located at respective positions for which the difference in position due to the change 101r, that is, the blur in the image 110I caused by a motion 01m of an imaging unit 101 has been canceled.

In other words, the picture processing device is whole or part of a camera.

The first picture 101a may be a picture including the first feature point (the position 101p), for example.

The second picture 101b may be a picture including a second feature point (the position 101q) at which a point on an object located at the first feature point is located.

The rotation matrix calculation unit 112 may calculate a positional relationship between the first feature point and the second feature point (the positional change 101r).

The calculated positional relationship is a basis of identification of a motion 101m of the imaging unit 101 between time at which the first picture 101a is taken and time at which the second picture 101b is taken.

The picture correction unit 113 may generate a corrected picture 113a from the picture 110I by correcting a difference in position (a difference caused by the motion 101m) in the picture 110I by as much as the calculated positional relationship.

The feature point masking unit 111x may determine whether or not the first feature point in the first picture 101a is a predetermined feature point (a feature point at a position 101s at which a point on a structural object (a building) in FIG. 13 or FIG. 2 is located). In other words, the feature point masking unit 111x may determine whether the first feature point in the first picture 101a is a feature point at the position 101s or a feature point at another position 101n.

Figure 5:
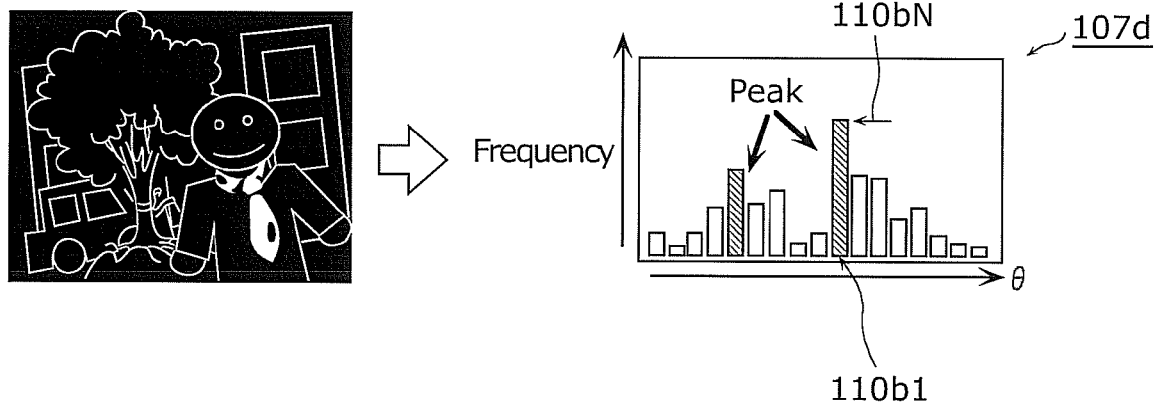
FIG. 5 shows an example of generation of an angle histogram from a picture on which edge detection has been performed.

The predetermined feature point may be a feature point (the feature point at the position 101s) which is in a region 101F showing a structural object (an image of building) in the first picture 101a and has an edge (the edge formed by the straight line 110L) such that, in the first picture 101a, the number of points (see a position 110Lp) at each of which an edge has the same angle (an angle 110b1) as an angle of the edge of the feature point (an angle 110b1 of the normal vector (described later) of the edge) is equal to a frequency of a peak angle (the number 110bN shown in FIG. 5).

The rotation matrix calculation unit 112 may calculate the positional relationship (positional change 101r) using a feature point (the position 101x) as a first feature point (a first position 101p) only when the feature point (the position 101x) is determined to be the predetermined feature point (the feature point at the position 101s).

That is, when the feature point is determined not to be a predetermined feature point (the feature point at the position 101s), the calculation using the feature point is not necessary.

With this, correction of the picture 110I to generate the corrected picture 113a is performed only based on the feature point at which the position 101x (position 101s) of the structural object is located. This increases accuracy of correction and allows avoidance of unsuccessful correction, thereby ensuring successful correction.

The picture processing device shall be described in detail below.

Embodiment 1

Figure 1:
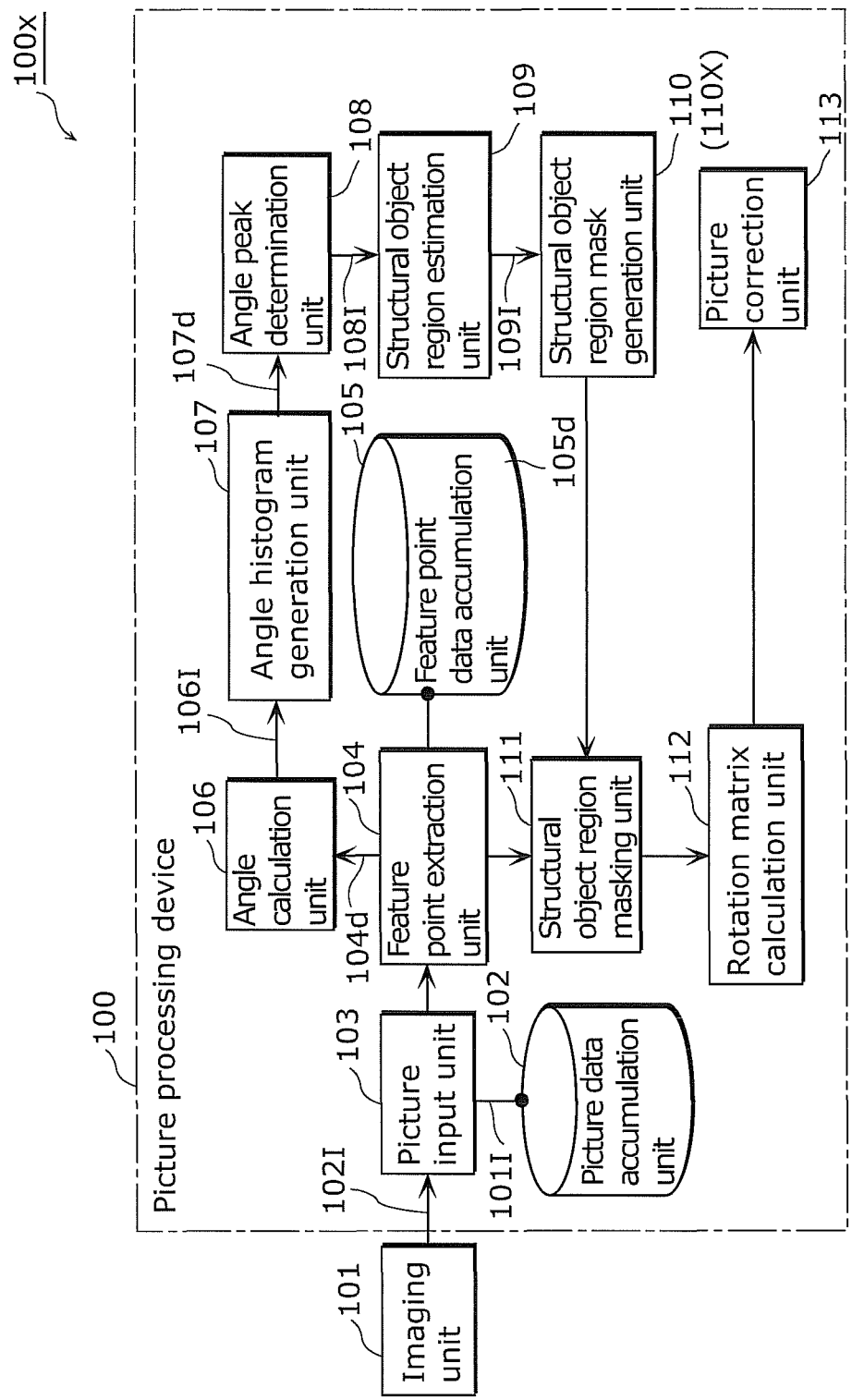
FIG. 1 shows an overall configuration of a picture processing device according to Embodiment 1 of the present invention.

FIG. 1 shows an overall configuration of a picture processing device (picture processing device 100) according to Embodiment 1 of the present invention.

An imaging unit 101 in FIG. 1 is a camera, such as a digital still camera or a digital video camera, having an imaging element such as a charge coupled device (CCD) or a complementary metal oxide semiconductor (CMOS). The imaging unit 101 takes a picture and outputs the picture as an electric signal.

A picture data accumulation unit 102 is a unit in which picture data 1 (first picture data, a first picture 101I) is stored. The picture data 1 is data generated temporally immediately before the imaging unit 101 generates picture data 2 (second picture data) by taking the second picture 102I.

A picture input unit 103 receives two items of picture data: picture data 2 generated by the imaging unit 101 and the picture data 1 stored in the picture data accumulation unit 2. Here, a picture 1 of the picture data 1 (the first picture 101I) is a picture taken temporally immediately before a picture 2 of the picture data 2 (the second picture 102I) is taken. The picture 2 is a picture taken immediately after the picture 1 is taken.

The two items of picture data may be data compression-coded in a general Joint Photographic Experts Group (JPEG) format, for example. Alternatively, they may be data in a video format such as MPEG-4. For example, the two items of picture data may be data of pictures at two different times in a video in an MPEG-4 format. The picture processing device 100, which is an example of the present invention, operates without regard for when the picture to be corrected is taken.

In a configuration according to Embodiment 1, the picture processing device 100, which is an example of the present invention, is built in a digital still camera or a digital video camera so that a picture is taken and corrected on the spot. On the other hand, the picture processing device 100 may be provided externally to an imaging apparatus. For example, the picture processing device 100 may be implemented as a personal computer on which an application including the feature of the picture processing device 100. In this case, the picture processing device 100 may receive pictures from a recording device such as a camera directly connected to the picture processing device 100 by a cable or may read picture data from a recording medium such as an SD memory card or through a network.

A feature point extraction unit 104 receives the picture 1 and picture 2 received by the picture input unit 103, extracts feature points of the picture 1, and generates feature point data 1 indicating the extracted feature points of the picture 1.

Here, each of the feature points is a point at which clear-cut vertical and horizontal edges in the picture intersect or a point which has two clear-cut edges in different directions in the vicinity. For example, it is preferable that feature points be present in both two pictures temporally consecutive, that is, the picture 1 and picture 2 so that the feature points can be stably detected. At this time, the precise positional relationship between the picture 1 and the picture 2 is still unknown. It is therefore necessary to generate a feature point which is present in both of the picture 1 and picture 2 using a certain criterion. When a Harris operator is used for generating such a feature point, a corner point is detected using edges in the pictures as a criterion such that a vertical edge and a horizontal edge intersect at the corner point.

The feature point extraction unit 104 calculates a feature point score indicating the degree of intersection of edges for each pixel. Thus, in theory, each pixel has a feature point score. However, using all calculated feature points for matching is not preferable from a viewpoint of computational cost and computational accuracy because the number of feature points usable for matching is limited when a picture processing device is used in an environment in which resources are limited as in the case of an embedded system. In this case, a predetermined number of pixels (points) having the highest feature point scores are used as feature points.

Since the edges used by the Harris operator reflect change in contrast (luminance) in a picture, change in illumination to a limited degree does not affect the contrast in the picture, and the edges remain. It is therefore unlikely that an edge disappears between frames unless an object to be shown on the picture as an image with the edge is blocked by an obstacle. It is thus likely that the points having higher feature point scores based on edge information are indicated both in the feature point data 1 and the feature point data 2. In consideration of this tendency, feature points having feature point scores higher than a given threshold are selected when feature point scores are used as a criterion of selecting feature points.

Here, when feature point scores are used for selecting feature points, the given threshold may be an average of the feature point scores in a picture or may be determined based on an average score of a plurality pictures in a time series. The number of such a threshold is not limited to one for the whole picture. Feature points may be selected using thresholds generated for respective regions, and the thresholds generated for respective regions may be based on a single picture or a plurality of pictures in a time series. The score may be based on scores as results of certain object recognition. This means, for example, that 1000 feature points originally present in the picture 1 are narrowed to 100. In this case, the rotation matrix calculation unit 112 eventually determines pairs of 100 feature points in the picture 1 and 100 feature points in the picture 2.

FIG. 2 shows examples of feature points.

Typical methods to be used for implementation of the feature point extraction unit 104 includes a Harris operator and SIFT.

In a feature point data accumulation unit 105, feature point data 1 (data 105d in FIG. 1) generated from the picture 1 (the first picture 101I) is accumulated. The picture 1 is a picture taken temporally immediately before the picture 2 from which the feature point data 2 (the second picture 102I) is extracted by the feature point extraction unit 104.

An angle calculation unit 106 generates angle information for each pixel from the edge information of vertical and horizontal edges calculated by the feature point extraction unit 104.

Figures 3B, 4:
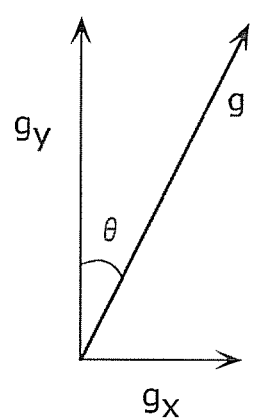
FIG. 3B shows a Sobel filter.
FIG. 4 shows an example of an angle detected by an operation of angle detection.

FIG. 3A and FIG. 3B each show Sobel filters.

In the case where Sobel filters are used for generating edge information, a matrix shown in FIG. 3A is used for generating x components and a matrix shown in FIG. 3B for generating y components so that the edge information is calculated.

Here, the coefficient matrices are 3*3 matrices, but larger matrices such as a 5*5 matrix or a 7*7 matrix may be used as coefficient matrices. General coefficient matrices are (2k−1)*(2k−1) square matrices where k is an integer equal to or larger than 2.

FIG. 4 shows an example of an angle detected by an operation of angle detection.

An angle is calculated using a formula $$\theta = \arctan(gy/gx),$$

where gx is the generated x component, and gy is the generated y component.

The process of calculating an angle is equivalent to a calculation of a normal vector to the direction of a luminance gradient of a focused pixel. The process of calculating an angle is performed on all the pixels to calculate a normal vector for each of the pixels.

FIG. 5 shows an example of generation of an angle histogram from a picture on which edge detection has been performed.

An angle histogram generation unit 107 generates an angle histogram from angle information calculated for the pixels by the angle calculation unit 106. The horizontal axis of the angle histogram represents angles, and the horizontal axis represents the frequency for the angles.

The preferable resolution of the histogram generated by the angle histogram generation unit 107 depends on the properties of a camera used for taking the picture. Generally, a resolution of one degree allows an angle peak determination unit 108 to detect a peak.

Here, the histogram may take it into consideration that noise in a picture affects the magnitude of pixel values. Specifically, for example, in the case where a resolution of the angle histogram is one degree, a pixel having an angle of 10 degree does not increase the frequency of 10 degrees but can be weightedly allocated so that the frequency of 10 degrees is increased by two and each of the frequencies of 9 degrees and 11 degrees is increased by one.

In Embodiment 1, it is assumed that the picture is taken using a lens having an ordinary angle of view and no distortion. When a picture taken using a lens having distortion is used, angle information of edges contains the distortion such that calculated angles are incorrect. In this case, the distortion in the picture to be used needs to be eliminated before calculating edge information so that correct angles can be obtained.

The angle peak determination unit 108 determines a peak angle which is an angle at which the angle histogram generated by the angle histogram generation unit 107 has a peak (see an angle 110b at which the angle histogram has a local maximum, for example). Here, a peak angle is determined from an angle histogram in the following way.

In the case where a picture includes a structural object such as an image of a building, an edge of the structural object is present as part of a straight line (see the straight line 110L in FIG. 2). The angles calculated from the edge, which is part of a straight line, are approximately the same (see angles such as an angle 110b1 of a normal to the straight line 110L at each point 110Lp on the straight line 110L in FIG. 2). On the other hand, unlike the edges of the structural object, the edges calculated from the region other than the structural object have such irregular shapes that the angles for the edges are likely to range widely.

Accordingly, the angle histogram is likely to have a peak at the angle for an edge of a structural object. It is thus possible to determine a structural object region in a picture based on a peak of an angle histogram by making use of the property.

It should be noted that there are a plurality of angles for edges of a structural object, such as a horizontal angle or a vertical angle. The angle peak determination unit 108 may therefore search for not only one peak angle but two or more peak angles.

The angle peak determination unit 108 determines that no structural object region is present when angle peak determination unit 108 determines no peak angle. In this case, no structural object region mask is generated and the feature points generated by the feature point extraction unit 104 are directly used.

A structural object region estimation unit 109 determines the position of the edge having the peak angle (see the angle 110b1 in FIG. 5) by the angle peak determination unit 108 and performs interpolation. The structural object region estimation unit 109 determines the position of the edge having the peak angle to be the position of the structural object in the distant view, and then a structural object region mask generation unit 110 generates a mask (a structural object region mask, that is, a masking picture) based on the determination. Specifically, the masking region of the generated mask may be a region including positions at which a structural object is present (see the positions such as the position 101s in FIG. 2) and excluding the other positions (see the position 101n). Then, a structural object region masking unit 111 masks the feature points selected by the feature point extraction unit 104. In other words, the feature points which are the positions at which the structural object is present (the position 101s) are selected as feature points to be used by the rotation matrix calculation unit 112, and, at the same time, the feature points which are not such positions (the position 101n) does not need to be selected.

Figure 6:
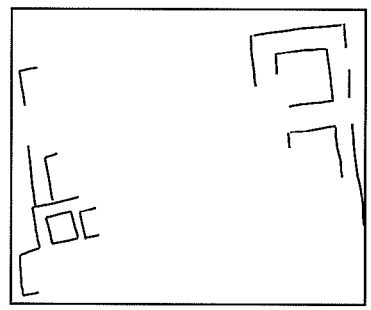
FIG. 6 shows an example of a structural object region mask generated from pixels having a peak angle of an angle histogram.

FIG. 6 shows an example of a structural object region mask generated from pixels having a peak angle of an angle histogram (see angles such as the angle 110b in FIG. 5).

The structural object region estimation unit 109 not only determines the positions of the peak angle but also performs interpolation. The interpolation needs to be performed because pixels having an angle determined to be a peak angle by the angle peak determination unit 108 may not sufficiently cover a structural object region necessary for masking feature points, that is, a mask generated based on the pixels having the peak angle may be insufficient for extracting a structural object region.

Such insufficient masking is due to two major causes.

One is a cause related to feature point scores generated by the feature point extraction unit 104. The other is a cause related to a bin width of an angle histogram generated by the angle histogram generation unit 107, that is, angular resolution.

More specifically, feature point scores are calculated based on luminance values of a picture. Because of this, the calculation may be affected by change in appearance of the picture due to change in illumination or camera positions between frames. In addition, noise may prevent fine matching of feature points even when the feature points roughly correspond to each other between frames, resulting in errors in the positions of the feature points.

For the angular resolution of an angle histogram, the higher the angular resolution is, the narrower the range of angles to be determined as peak angles is. As a result, fewer pixels are determined to be part of a structural object in a picture, and thus a problem occurs that the region covered by a structural object region is too small.

In contrast, the lower the angular resolution is, the wider the range of angles to be determined as peak angles is. Accordingly, more pixels in a picture have peak angles. Although more pixels are determined to be part of a structural object, more pixels even outside a structural object region may be determined as being in a structural object region.

There is such a trade-off.

Due to the two major causes, a structural object region may be insufficiently masked. Here, in order to avoid such insufficient masking, the structural object region estimation unit 109 not only determines the positions of the peak angle but also performs interpolation of a structural object region.

Figure 8:
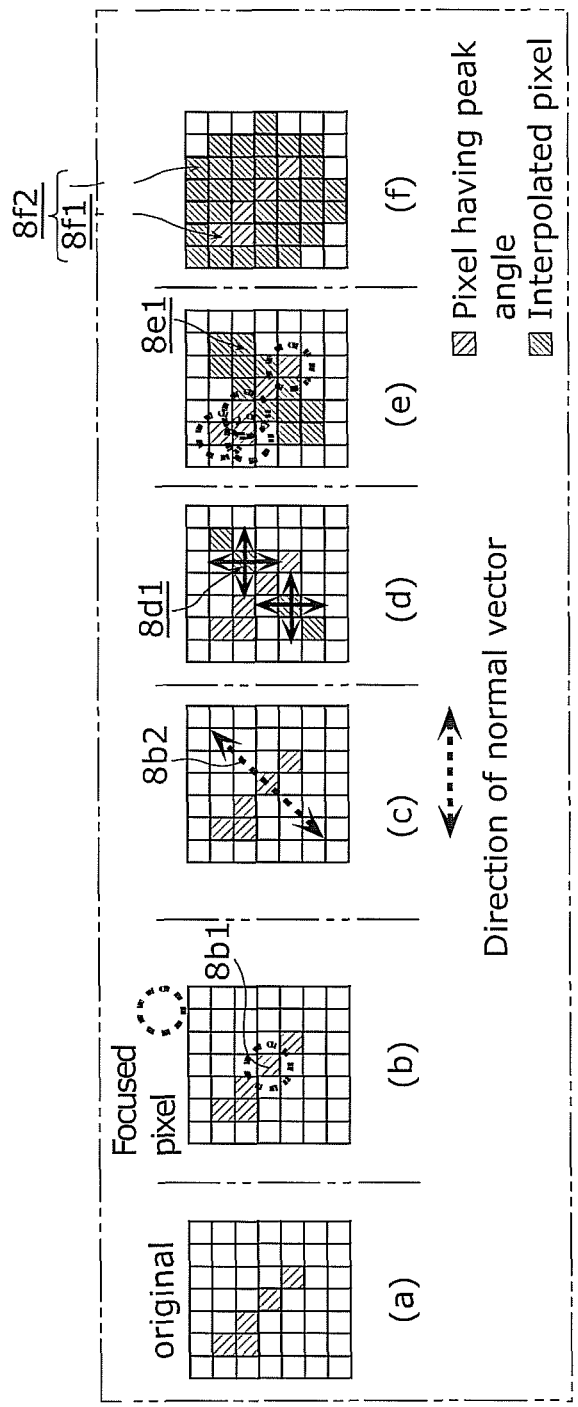
FIG. 8 shows an example of expansion of a structural object region.

FIG. 8 shows an example of expansion of a structural object region.

An example of interpolation shall be described with reference to FIG. 8.

The following is a description of interpolation for limiting the effect of errors in the positions of feature points due to feature point scores as mentioned above.

The structural object region estimation unit 109 focuses on a pixel having a peak angle (see a pixel 8b1 encircled by a dashed circle in (b) in FIG. 8) when a region of a picture as shown in (a) in FIG. 8 is processed. The structural object region estimation unit 109 expands the region including the pixel 8b1 in the direction of a normal vector (a direction 8b2) calculated by the angle calculation unit 106 ((c) in FIG. 8), and then the region expanded in the direction of the normal vector (a region 8d1) is further expanded outward (see a region 8e1 in (e) in FIG. 8).

Such expansion of regions based on a peak angle on the edge of a structural object performed on all pixels having the peak angle in the same manner ((e) in FIG. 8) so that the region of the structural object is expanded (see a region 8*f*1 which is the region before expansion, and a region 8*f*2, which is the region after expansion, in (f) in FIG. 8).

Although only two pixels are interpolated in the direction of the normal vector in the example, the number of pixels to be interpolated may be changed depending on a picture size or an angle of view.

Figure 7:
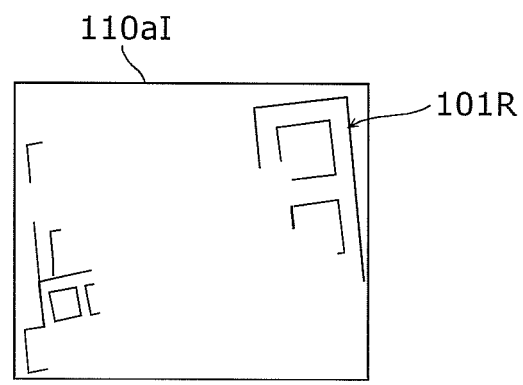
FIG. 7 shows an example of an expanded structural object region of the structural object region mask shown in FIG. 6.

FIG. 7 shows an example of an expanded structural object region of the structural object region mask shown in FIG. 6.

The impact of errors in positions of feature points is limited as shown in FIG. 7 by expanding a marginal region of a structural object.

Optionally, an extended method of interpolation may be used depending on characteristics of feature point extraction. For example, when a Harris operator is used in a method of extracting feature points, the extracted feature points are likely to be present on corner points in a picture. Accordingly, the number of pixels interpolated on the corner points may be increased.

Figure 9:
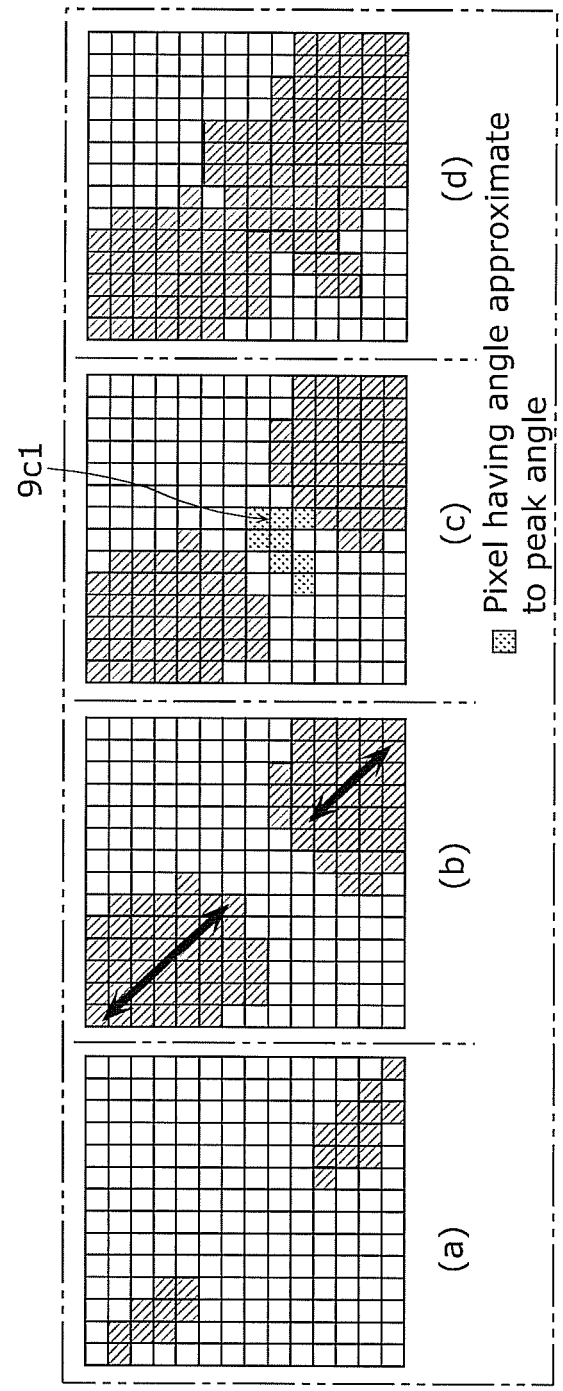
FIG. 9 shows an example of a method of interpolation of a structural object region.

FIG. 9 shows an example of a method of interpolation of a structural object region.

This interpolation is performed in order to solve the trade-off of the resolution of an angle histogram. The following case may occur after the interpolation to limit the impact of errors in the positions of feature points ((b) in FIG. 9). In this case ((b) in FIG. 9), there is a region having an angle within a predetermined range from the peak angle, and also has a normal vector which is the same as the normal vector of the pixel having the peak angle and is located in the direction (see arrows in FIG. 9) perpendicular to the direction of the normal vector of the pixel having the peak angle (see the direction 8b2 in FIG. 8). A region 9c1 is interpolated into the structural object region ((c) in FIG. 9) only in this case, on the basis that this is the case where an edge on a structural object is lost for some reason such as illumination conditions or noise.

This is based on a fact that a region having an angle approximate to a peak angle of edges of a structural object in a picture and located between the edges is likely to be an edge of the same structural object (see the region 9c1).

The structural object region estimation unit 109 thus interpolates a region by making use of properties of the edges of a structural object and properties of angle information to generate a definitive structural object region mask ((d) in FIG. 9).

Such a mask generated by the structural object region mask generation unit 110 may be a binary mask so that, for example, the value of 1 represents the region determined to be a structural object region, and the value of 0 represents the region not determined to be a structural object region.

Figure 10A:
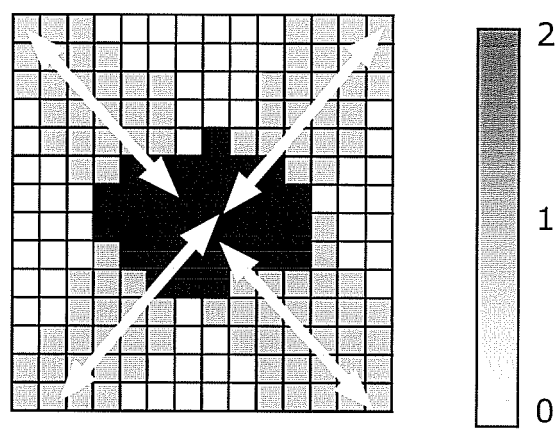
FIG. 10A shows a case where three or more values are used for weighting of regions of a structural object region mask.
Figure 10B:
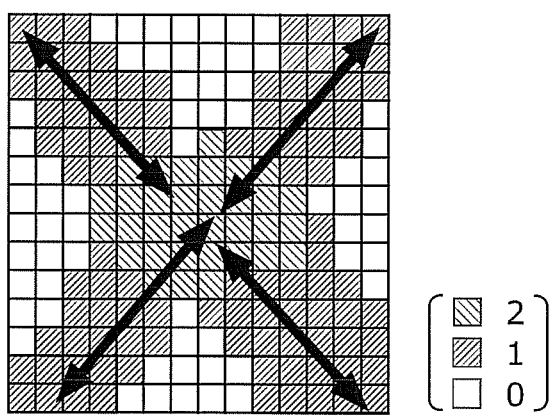
FIG. 10B shows a case where three or more values are used for weighting of regions of a structural object region mask.

FIG. 10A and FIG. 10B show a case where three or more values are used for weighting of regions in a structural object region mask.

FIG. 10B illustrates the case shown in FIG. 10A more schematically. FIG. 10B should be referred to as necessary.

There may be the case where a normal vector b is present in the direction of the two same normal vectors a, and the normal vector b and the normal vector a cross at right angles as shown in FIG. 10A. In this case, a mask may be generated so that the value of 2 represents a region around a region based on the determination that the region where the normal vectors a and b cross at right angles is a corner where a vertical edge and a horizontal edge cross, the value of 1 represents the region determined to be a structural object region, and the value of 0 represents the region not determined to be a structural object region. Although the example shows a case where multiple values includes the three values of 0 to 2, four or more values may be also used in a similar manner.

The structural object region masking unit 111 masks the feature points generated by the feature point extraction unit 104 with the mask generated by the structural object region mask generation unit 110. This makes it possible to distinguish feature points generated from a structural object region and feature points generated from a non-structural object region such as a near view or a natural object among the feature points generated by the feature point extraction unit 104.

In the case where a mask generated by the structural object region mask generation unit 110 allows not only distinction between a structural object region and a non-structural object region but also distinction between regions including a corner region, a matching unit varies weighting of feature points.

The mask generated by the structural object region mask generation unit 110 is thus applied. With this, when a picture includes a structural object region, matching can be performed using feature points in the structural object region which is in a distant view region of the picture. This increases accuracy in matching. In order to increase accuracy in matching in this manner, feature points in a structural object region are preferentially used.

In contrast, when a picture includes no structural object region, the feature points generated by the feature point extraction unit 104 are directly used. When usable feature points obtained as a result of masking using a structural object region mask are too few, feature points in a structural object region are preferentially used, and a shortage in feature points is made up for by using a certain number of feature points in a non-structural object region having higher feature point scores.

Here, the shortage in feature points is made up for by using the feature points in a non-structural object region for the following reason. In the case where the computational amount depends on the number of feature points and the number of feature points is not large enough to consume a given computational resource, there is a possibility that feature points usable for matching are not limited to a small number of feature points in a structural object region but a larger number of feature points including those outside the structural object region are usable for matching. This increases the likelihood of successful matching, which is the reason for the shortage is thus made up for.

The rotation matrix calculation unit 112 calculates a rotation matrix representing blur due to camera shake between the picture 1 and the picture 2, based on the feature points finally selected as a result of masking by the structural object region masking unit 111. The rotation matrix may be calculated using a method such as RANdom SAmple Consensus (RANSAC).

The picture correction unit 113 corrects the blur due to camera shake between the picture 1 and the picture 2 using the rotation matrix calculated by the rotation matrix calculation unit 112.

Figure 11:
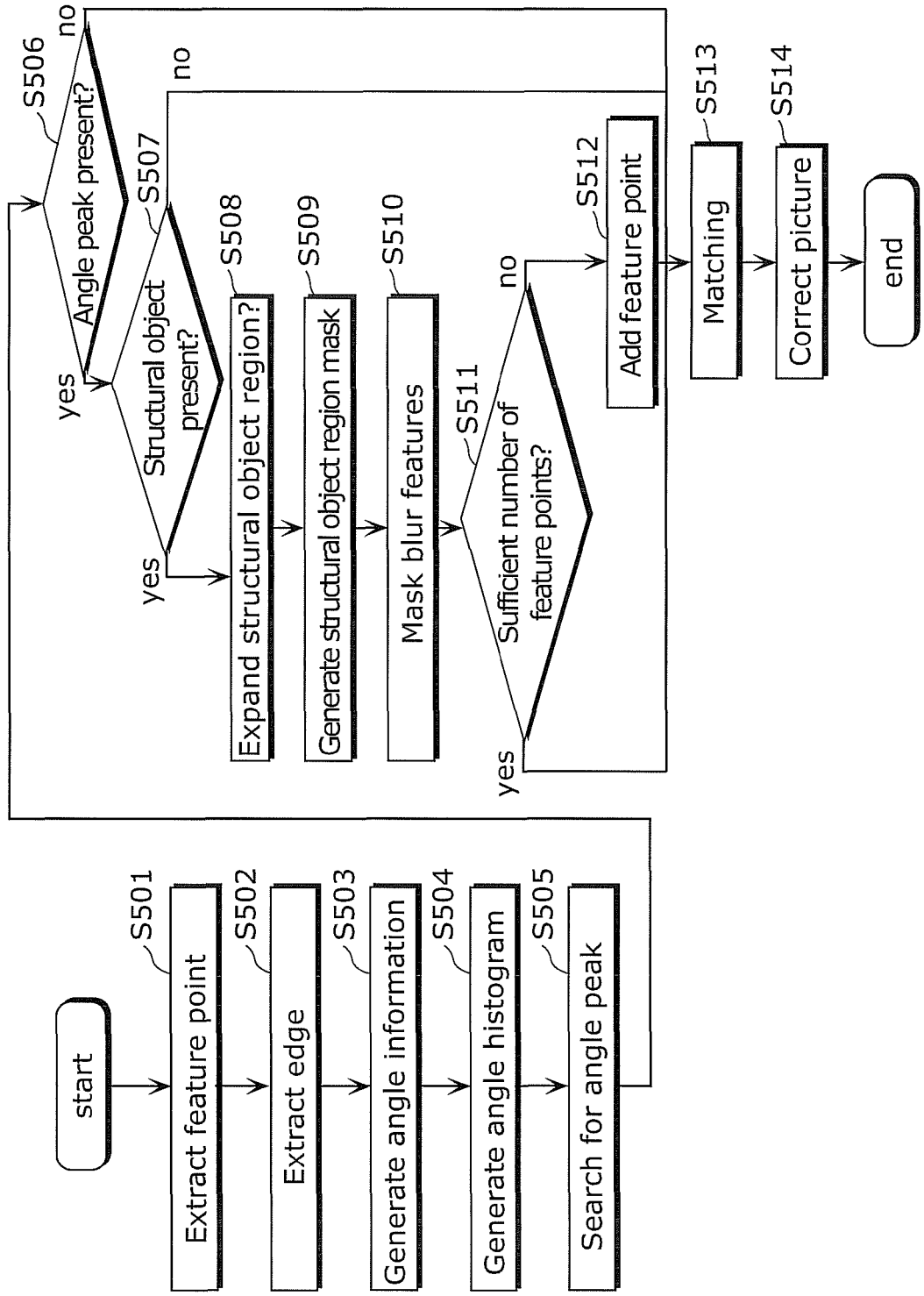
FIG. 11 is a flowchart of an operation of the picture processing device according to Embodiment 1 of the present invention.

FIG. 11 is a flowchart for the picture processing device according to Embodiment 1.

First, the picture input unit 103 reads the picture 2 taken by the imaging unit 101 and the picture 1 accumulated in the picture data accumulation unit 102. The feature point extraction unit 104 extracts feature point data 1 from the picture 1 (Step S501).

Next, the angle calculation unit 106 calculates vertical and horizontal edges from the picture 1 (Step S502), and generates angle information based on the edges (Step S503).

The angle histogram generation unit 107 generates an angle histogram from the generated angle information (Step S504), and the angle peak determination unit 108 searches for a peak of the angle histogram (Step S505).

Then, the angle peak determination unit 108 determines whether or not an angle peak is present (Step S506), and, when a peak is present at an angle, determines whether or not the peak is large enough to represent a structural object (Step S507).

When the angle peak determination unit 108 determines that a structural object is present (Yes in Step S507), the structural object region estimation unit 109 expands the region of the structural object so that a structural object region mask can be generated (Step S508).

After the region of the structural object is expanded, the structural object region mask generation unit 110 generates a structural object region mask (Yes in Step S507), and the generated mask is applied (Step S510). After the application of the structural object region mask, the number of the feature points in the structural object region is counted (Step S511), and when the number of the feature points is smaller than a predetermined number (No in Step S511) feature points in a non-structural object region are additionally used (Step S512).

Next, the feature point data 2 of the picture 2 accumulated in the feature point data accumulation unit 105 is read.

Next, the rotation matrix calculation unit 112 calculates a rotation matrix representing blur between the picture 1 and the picture 2 (Step S513), and the picture correction unit 113 corrects the picture using the calculated rotation matrix (Step S514).

In this configuration, the structural object region mask generation unit 110 and the structural object region masking unit 111 obtain feature points of a structural object region so that matching can be performed between pictures including a near view region or many nature objects in a distant view region to accurately estimate the amount of blur.

As a result, accurate matching is ensured. Specifically, accurate matching is performed by a device including: a picture obtainment unit which obtains a first picture and a second picture which is taken immediately after the first picture; a feature point extraction unit which extracts feature point; a masking picture generation unit which generates a masking picture based on the first picture; a feature point masking unit which masks the feature points of the first picture; and a picture correction unit which uses a rotation matrix calculated using the feature points of the first picture specified as a result of the masking and the feature point of the second picture.

Embodiment 2

Figure 12:
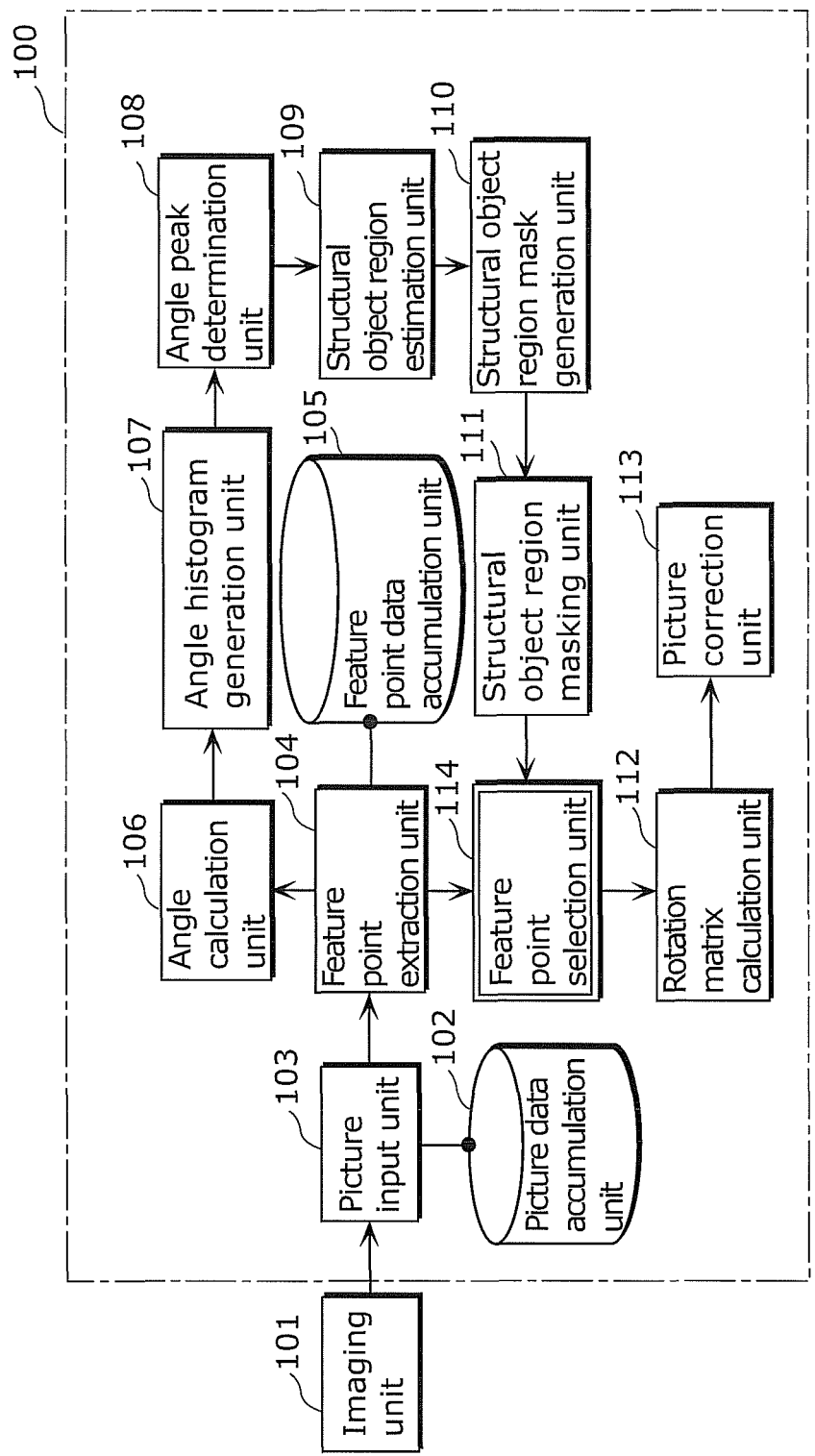
FIG. 12 shows a picture processing device according to Embodiment 2 of the present invention.

FIG. 12 illustrates an overall view of Embodiment 2 of the present invention.

In FIG. 12, constituent elements shown also in FIG. 1 are denoted with the same reference signs, and the description thereof is omitted accordingly.

The difference of Embodiment 2 from Embodiment 1 is a feature point selection unit 114. The feature point selection unit 114 selects a feature point to be used for matching from among one or more feature points indicated by feature point data 1 generated by a feature point extraction unit 104, using a criterion other than feature point scores.

Here, the feature point extraction unit 104 calculates a feature point score indicating the degree of intersection of edges for each pixel. Thus, in theory, each pixel has a feature point score. However, using all the calculated feature points for matching is not preferable from a viewpoint of computational cost or computational accuracy. In Embodiment 1, this problem is solved by using a predetermined number of feature points having highest feature point scores. However, the feature point scores are based on only luminance values. Because of this, estimation of the amount of blur due to camera shake may turn out to be unsuccessful when, for example, objects with a texture having great contrast concentrate in a distant view. This is because characteristics of whole the picture cannot be reflected on feature point scores based on only luminance values. It is therefore necessary to use another criterion in addition to such feature point scores.

One possible criterion is positional relationship between feature points in a picture. Positional relationship between feature points is used as a selection criterion to avoid the following case. The case is that matching may result in failure due to excessive use of local feature points when one or more feature points having high feature point scores concentrating in a certain region are selected and used. It is possible to avoid such a case by using positional relationship between feature points. Furthermore, when distance between feature points is used, a distance of a certain length in a picture is dynamically set depending on, for example, a focal length or an angle of view of an imaging unit 101. The feature point selection unit 114 uses such a criterion other than feature point scores to select a feature point to be used for matching.

Here, information on luminance gradient around a feature point may be used as a criterion of selecting feature points other than feature point scores. A relative distance relation between feature points in a picture may be also used as a criterion of selecting feature points other than feature point scores. It should be noted that the feature point selection unit 114 does not take in to consideration whether each feature point is in a distant view region or a near view region in a picture. The feature points generated by the feature point selection unit 114 thus include both a feature point in a distant view and a feature point in a near view region.

It is also possible to use a gradient angle histogram based on angle information generated based on information on vertical and horizontal edges in a picture. When the gradient angle histogram is used for extraction of a structural object region in a distant view region in a picture and the expansion and interpolation, the extraction of a structural object region in a distant view region can be performed with a relatively high accuracy. A picture processing device may be provided which is capable of estimating the amount of blur due to camera shake between two frames with respect to a distant view region by preferentially using feature points extracted from the structural object region even when the picture includes a near view region.

The structural object refers to an object having a geometric structure, such as a building, a pillar, or a window. For a structural object, the condition that the region has few inter-frame motions or the condition that motions in the region are very small and in a uniform distance is satisfied. In addition, a structural object has a characteristic that edges in a picture are likely to present on a specific line segment of the structural object due to its geometric structure.

In Embodiment 2, the structural object region mask generation unit 110 and the structural object region masking unit 111 obtain feature points in such a structural object region. This allows matching between pictures including a near view region or many nature objects in a distant view region so that the amount of blur can be accurately estimated.

The above-described constituent elements may be combined to generate a synergistic effect. Compared to this, in the conventional techniques, no synergistic effect is generated because of lack of all or part of the constituent elements, so that the technique in the present invention is distinguishable from the conventional technique.

Furthermore, a system 100x including the imaging unit 101 and the picture processing device 100 may be constructed (FIG. 13).

The picture processing device 100 may operate in the following manner.

The picture 1 may include a near view region and a distant view region.

Here, the near view region is a region including an image of a relatively close area, and the near view region may include an image of a person (for example, a passerby) as described above.

On the other hand, the distant view region is a region including an image of an area relatively distant from a camera, and the distant view region may include objects such as a natural object (a tree swayed by wind) or an object having a geometric structure such as a pillar or a window (a structural object).

The near view region may include a feature point relatively inadequate for estimation of the amount of blur because the near view region includes an object such as a passerby as described above. On the other hand, the distant view region may include a feature point relatively adequate for estimation of the amount of blur as described above.

However, if the amount of blur is estimated using a feature point of an object just because the object is distant, the estimation may be performed using a feature point not on a structural object but on a natural object (for example, a tree swayed by wind).

In order to avoid this, edges present on line segments of a structural object in the distant view region segment may be detected (S502 to S510).

Specifically, for example, an edge to be detected among a plurality of edges has an angle at which the angle histogram has a peak as described above (for example, see the case of Yes in S506).

The amount of blur may be estimated based on the feature point on the structural object at which the edge is detected (Step S513).

Specifically, a rotation matrix representing the amount of blur may be generated as described above (Step S513).

The picture 2 may be corrected based on the estimated amount of blur may (S514).

It is thus possible to achieve accurate matching (appropriate estimation) of a picture including many natural objects in a distant view region, so that appropriate estimation is ensured.

The structural object region mask generation unit 110 may be included in the mask generation unit 110x. More specifically, for example, the angle calculation unit 106 to the structural object region estimation unit 109 may be also included in the mask generation unit 110x.

In this case, the picture processing device may operate in the following manner.

The imaging unit 101, which takes a first picture 101a (FIG. 13) and a second picture 101b, makes a motion 101m between taking the first picture 101a and taking the second picture 101b.

For example, the first picture 101a may be the first picture 101I taken earlier (see FIG. 1) and the second picture 101b may be the second picture 102I taken later as described above.

The first picture 101a may include a first position 101p.

The second picture 101b may include a second position 101q at which a point on an object located at the first position 101p is located.

The motion 101m may be determined from the first position 101p and the second position 101q.

It should be noted that FIG. 13 shows the schematic position of the second position 101q located at a long distance from the schematic position of the first position 101p for convenience of illustration.

Specifically, the motion 101m may be determined using additional information other than the first position 101p and the second position 101q.

The picture correction unit 113 may correct a picture 101I, which is one of the first picture 101a and the second picture 101b, to generate the corrected picture 113a.

In other words, the one picture 101I includes a difference in position due to the motion 101m of the imaging unit 101, such as a difference in position between the first position 101p and the second position 101q as described above.

The corrected picture 113a may be a picture generated by canceling and compensating such a difference of the one picture 101I.

The one picture 101I is, for example, the second picture 101b taken later.

However, a user to take pictures may have on the imaging unit 101.

For example, a father may wear an imaging apparatus (such as a digital camera or a video camera) including an imaging unit 101 and take a picture of his child using the imaging apparatus without holding the imaging apparatus in his hands.

In some cases, pictures may be taken using the imaging unit 101 mounted on a vehicle such as a police car.

In some cases, pictures may be taken by a walking user or without using a finder.

In these cases, it can be assumed that the magnitude of the motion 101m is relatively large.

The following operation may be performed in these cases.

Specifically, there may be a position 101s at which a structural object is located (see FIG. 13) and another position 101n (see FIG. 2, for example), and they are positions 101x in the first picture 101a.

The structural object is a building, for example.

The other position 101n is a position at which an image of a person, a forest, or like that is located.

It can be assumed that the structural object is farther than the person from the imaging unit 101 so that the position 101s of the structural object is included in a distant view region of the first picture 101a.

In addition, it can be assumed that, unlike a person who may move or branches and leaves in the forest swinging in the wind, the structural object does not move, remaining static.

In contrast, it can be assumed that the other position 101n is included in a near view region and a person whose image is located at the position 101n often moves.

In this case, a specific process on a motion 101m using the position 101p of the structural object as the first position 101p will be relatively appropriate.

Here, to be appropriate means that the motion 101m is determined with a relatively high accuracy or that determination of the motion 101m is unlikely to be unsuccessful.

In contrast, a specific process using the other position 101n as the first position 101p will be inappropriate.

Here, to be inappropriate means that the motion 101m is determined with a relatively low accuracy or that determination of the motion 101m is likely to be unsuccessful.

In order to avoid this, a determination may be made as to whether the position 101x (FIG. 13) is the position 101s at which a structural object is located or the other position 101n (see the feature point masking unit 111x, S509, for example).

In other words, the first picture 101a may have a straight line of a structural object (see the straight line 110L in FIG. 2).

The straight line is, for example, a straight line of an outline of a building (the object in the region 101F) which is the structural object or a straight line along a window frame of the building (see FIG. 2).

In other words, the position 101x may be determined to be the position 101p of the structural object when the position 101x is on the straight line, and the other position 101n when not on the straight line.

Specifically, the process may be performed based on a detection of a straight line (the straight line 110L) so that a determination as to whether or not the position 101 is on the detected straight line is made.

In addition, there are two possible conditions as follows.

Specifically, a first condition is that the position 101x has an edge formed by a straight line.

A second condition relates to an angle corresponding to an angle of the edge (see the angle 110b1 of the normal to the edge in FIG. 2) at the position 101x (for example, the position 101s in FIG. 2). It should be noted that the structural object region masking unit 111 may be included in the feature point masking unit 111x.

In other words, the corresponding angle may be an angle which is the same as the angle at the position 101x (the angle 110b1).

Furthermore, the corresponding angle may be either the angle which is the same as the angle at the position 101x (the angle 110b1) or an angle perpendicular to the angle, that is, an angle 110b2.

More specifically, for example, the corresponding angle is an angle which shows (or allows an estimation) that the position 101x is on a straight line when the number (see the frequency 110bN in FIG. 5) of positions (see the positions 110Lp) at each of which an edge has the angle (for example, the angle 110b1) is equal to or larger than a threshold.

Thus, the second condition is that the number (see the frequency 110bN in FIG. 5) of positions (see the positions 110Lp) at each of which an edge has the (above-mentioned) angle corresponding to the angle of the edge at the position 101x is larger than a threshold.

When both of the first condition and the second condition are satisfied, the position 101x may be determined to be the position 101s at which a structural object is located. When either of them is unsatisfied, the position 101 may be determined to be the other position 101n.

With this, the motion 101m is determined based on the position 101s (FIG. 2) at which a structural object is located, and no determination is made based on the other position 101n. The motion 101m is thus determined with a relatively high accuracy and less possibility of a certain failure.

Furthermore, the other image 101I is corrected based on the determined motion 101m so that a picture can be corrected with a higher accuracy and a higher success rate.

More specifically, the mask generation unit 110x may generate data 110a (FIG. 13) specifying a region (masking region) as describe above.

The resulting data 110a may be data specifying the masking picture.

The region specified may be a region such that the position 101x is the position 101s at which a structural object is located when the position 101x is included in the region, and the position 101x is the position 101n when the position 101x is not included in the region.

Furthermore, the feature point extraction unit 104 may generate data 104a which indicates, as the position 101x, the above mentioned feature point extracted by the feature point extraction unit 104.

Furthermore, when the position 101x is included in the region (masking region) indicated by the generated data 112a, the indicated position 101x may be determined to be the position 101s of the structural object. When not included, the indicated position 101x may be determined to be the other position 101n.

Furthermore, data 112a may be generated which indicates the position 101x determined to be the position 101s of the structural object and does not indicate the position 101x determined to be the other position 101n.

Furthermore, data 112d indicating the specified motion 101m may be generated by performing a specific process on the motion 101m using the position 101x as the first position 101p based on the position 101x indicated by the generated data 112a.

The generated data 112d is data of a rotation matrix representing the specified motion 101m, for example.

Furthermore, the above-mentioned other picture 110I may be corrected based on the generated data 112d so that the corrected picture 113a is generated.

Such correction processing based on the specified motion 101m may be performed using a conventional technique.

As described above, two or more positions 101x may be specified as the positions 101x at which a structural object is located.

Furthermore, an average of motions determined from the positions 101x may be specified as the motion 101m.

In this manner, the position 101x determined to be the position 101s at which a structural object is located may be used for the specific process on the motion 101m while the position 101x determined to be the other position 101n is not used as the first position 101p.

In addition, a straight line in the first picture 101a (the straight line 110L in FIG. 2) may be specified. Then, a determination may be made as to whether or not the position 101x is the position 101s at which a structural object is located by determining whether or not the position 101x is on the specified straight line.

The present invention may be configured as a camera (for example, a digital camera) including the picture processing device 100 and the imaging unit 101.

The present invention may be also configured as a system 100x including a digital camera which is the imaging unit 101 and the picture processing device 100 which is a computer (for example, a personal computer) for picture processing on the first picture 101a and the second picture 101b taken by the imaging unit 101.

The motion 101m of the imaging unit 101 may be a rotational motion around a predetermined center such as a wrist joint of a user's hand holding the imaging unit 101. Data 112d may be generated so that the data 112d represents rotation matrix representing such a rotational motion.

Selection of a feature point to be used for correction processing may be made based on such plurality of criteria.

Specifically, for example, a feature point to be used may be specified (selected) which satisfies both a condition based on a first criterion and a condition based on a second criterion. The first condition is that the feature point is included in the masking region. The second condition may be any appropriate condition.

The present invention has been described based on Embodiment 1 and Embodiment 2 but is not limited to the embodiments. The present invention includes variations of the embodiment conceived by those skilled in the art. Furthermore, embodiments configured by optionally combining the constituent elements of Embodiment 1 and Embodiment 2 are also within the scope of the present invention.

Embodiment 1 and Embodiment 2 are provided for illustrative purposes only, and any embodiments to which the present invention is applicable are within the scope of the present invention.

For example, an embodiment in which the constituent elements described separately in Embodiment 1 or Embodiment 2 are combined is also within the scope of the present invention. Embodiments including such a combination are also disclosed herein.

Furthermore, the present invention may be implemented not only as a picture processing device but also as a method including the processes performed by the processing units included in the picture processing device as steps. Furthermore, the present invention may be also implemented as a program which causes a computer to execute the steps. Furthermore, the present invention may be implemented as a computer-readable recording medium on which the program is recorded.

Furthermore, the present invention may be implemented as an integrated circuit having the functions accomplished using the techniques, as a computer program to provide a computer with the functions, and the like. The integrated circuit may be a (Large Scale Integration) LSI or any other type of an integrated circuit. Furthermore, the present invention may be implemented as a method such as a method including the steps, a method of producing any of the above, a method of transmitting the computer program, or a method of storing the computer program, or as a data structure of data including the computer program.

INDUSTRIAL APPLICABILITY

The picture processing device according to the present invention is applicable to a picture correction device such as a digital still camera, a video camera, a wearable camera, or as software for personal computers.

The picture processing device allows more accurate determination of a motion of an imaging unit (see the motion 101m of FIG. 13) with a higher success rate.

REFERENCE SIGNS LIST

100 Picture processing device
101 Imaging unit
101a First picture
101b Second picture
101F Region
102 Picture data accumulation unit
103 Picture input unit
104 Feature point extraction unit
105 Feature point data accumulation unit
106 Angle calculation unit
107 Angle histogram generation unit
107d Histogram
108 Angle peak determination unit
109 Structural object region estimation unit
110 Structural object region mask generation unit
110aI Masking picture
110x Mask generation unit
111 Structural object region masking unit
111x Feature point masking unit
112 Rotation matrix calculation unit
113 Picture correction unit

The invention claimed is:

1. A picture processing device comprising:
a picture obtainment unit configured to obtain a first picture and a second picture, the first picture being taken before the second picture is taken;
a feature point extraction unit configured to extract feature points from the first picture and feature points from the second picture;
a masking picture generation unit configured to generate a masking picture based on edges in the first picture;
a feature point masking unit configured to mask the feature points of the first picture extracted by said feature point extraction unit, with the masking picture generated by said masking picture generation unit;
a calculation unit configured to calculate a positional relationship between the first picture and the second picture based on the feature point specified from the feature points as a result of the masking by said feature point masking unit and the extracted feature points of the second picture; and
a picture correction unit configured to correct one of the first picture and the second picture based on the positional relationship calculated by said calculation unit,
wherein said masking picture generation unit is configured to generate the masking picture based on angle information calculated based on the edges in the first picture.

2. A picture processing device comprising:
a picture obtainment unit configured to obtain a first picture and a second picture, the first picture being taken before the second picture is taken;
a feature point extraction unit configured to extract feature points from the first picture and feature points from the second picture;
a masking picture generation unit configured to generate a masking picture based on edges in the first picture;
a feature point masking unit configured to mask the feature points of the first picture extracted by said feature point extraction unit, with the masking picture generated by said masking picture generation unit;
a calculation unit configured to calculate a positional relationship between the first picture and the second picture based on the feature point specified from the feature points as a result of the masking by said feature point masking unit and the extracted feature points of the second picture; and
a picture correction unit configured to correct one of the first picture and the second picture based on the positional relationship calculated by said calculation unit,
wherein said masking picture generation unit is configured to generate the masking picture for masking a region including pixels each having a peak angle of an angle histogram generated based on angle information calculated from the edges in the first picture.

3. A picture processing device comprising:
a picture obtainment unit configured to obtain a first picture and a second picture, the first picture being taken before the second picture is taken;
a feature point extraction unit configured to extract feature points from the first picture and feature points from the second picture;
a masking picture generation unit configured to generate a masking picture based on edges in the first picture;
a feature point masking unit configured to mask the feature points of the first picture extracted by said feature point extraction unit, with the masking picture generated by said masking picture generation unit;
a calculation unit configured to calculate a positional relationship between the first picture and the second picture based on the feature point specified from the feature points as a result of the masking by said feature point masking unit and the extracted feature points of the second picture; and
a picture correction unit configured to correct one of the first picture and the second picture based on the positional relationship calculated by said calculation unit,
wherein when an angle histogram generated based on angle information calculated based on the edges in the first picture has a plurality of peak angles, said masking picture generation unit is configured to generate the masking picture for masking a region including pixels where edge having the respective peak angles are present.

4. A picture processing device comprising:
a picture obtainment unit configured to obtain a first picture and a second picture, the first picture being taken before the second picture is taken;
a feature point extraction unit configured to extract feature points from the first picture and feature points from the second picture;
a masking picture generation unit configured to generate a masking picture based on edges in the first picture;
a feature point masking unit configured to mask the feature points of the first picture extracted by said feature point extraction unit, with the masking picture generated by said masking picture generation unit;
a calculation unit configured to calculate a positional relationship between the first picture and the second picture based on the feature point specified from the feature points as a result of the masking by said feature point masking unit and the extracted feature points of the second picture; and a picture correction unit configured to correct one of the first picture and the second picture based on the positional relationship calculated by said calculation unit, wherein said masking picture generation unit is configured to expand a region to be masked, by generating the masking picture so that the masking picture masks a region which is included in the first picture and includes a pixel having a peak angle of an angle histogram of the first picture and pixels adjacent to the pixel within a certain range.

5. A picture processing device comprising:

a picture obtainment unit configured to obtain a first picture and a second picture, the first picture being taken before the second picture is taken;

a feature point extraction unit configured to extract feature points from the first picture and feature points from the second picture;

a masking picture generation unit configured to generate a masking picture based on edges in the first picture;

a feature point masking unit configured to mask the feature points of the first picture extracted by said feature point extraction unit, with the masking picture generated by said masking picture generation unit;

a calculation unit configured to calculate a positional relationship between the first picture and the second picture based on the feature point specified from the feature points as a result of the masking by said feature point masking unit and the extracted feature points of the second picture; and a picture correction unit configured to correct one of the first picture and the second picture based on the positional relationship calculated by said calculation unit, wherein said masking picture generation unit is configured to expand a region to be masked so that the region to be masked includes a pixel included in the first picture and having an angle within a certain margin of error from a peak angle of an angle histogram of the first picture.

6. A picture processing device comprising:

a picture obtainment unit configured to obtain a first picture and a second picture, the first picture being taken before the second picture is taken;

a feature point extraction unit configured to extract feature points from the first picture and feature points from the second picture;

a masking picture generation unit configured to generate a masking picture based on edges in the first picture;

a feature point masking unit configured to mask the feature points of the first picture extracted by said feature point extraction unit, with the masking picture generated by said masking picture generation unit;

a calculation unit configured to calculate a positional relationship between the first picture and the second picture based on the feature point specified from the feature points as a result of the masking by said feature point masking unit and the extracted feature points of the second picture; and a picture correction unit configured to correct one of the first picture and the second picture based on the positional relationship calculated by said calculation unit, wherein the first picture includes a first feature point, the second picture includes a second feature point at which a point on an image located at the first feature point is located, said calculation unit is configured to calculate the positional relationship between the first feature point and the second feature point, said picture correction unit is configured to generate a corrected picture by correcting a difference in position in the one picture by as much as the calculated positional relationship, said feature point masking unit is configured to determine whether or not the first feature point in the first picture is a predetermined feature point, the predetermined feature point is a feature point which is in a region showing an image of a building in the first picture and has an edge such that, in the first picture, the number of points at each of which an edge has a same angle as an angle of the edge of the feature point is equal to a frequency of a peak angle, and said calculation unit is configured to calculate the positional relationship using the feature point as the first feature point only when the feature point is determined to be the predetermined feature point, and not to calculate the positional relationship using the feature point when the feature point is determined not to be the predetermined feature point.

7. An integrated circuit comprising:

a picture obtainment unit configured to obtain a first picture and a second picture, the first picture being taken before the second picture is taken;

a feature point extraction unit configured to extract feature points from the first picture and feature points from the second picture;

a masking picture generation unit configured to generate a masking picture based on edges in the first picture;

a feature point masking unit configured to mask the feature points of the first picture extracted by said feature point extraction unit, with the masking picture generated by said masking picture generation unit;

a calculation unit configured to calculate a positional relationship between the first picture and the second picture based on the feature point specified from the feature points as a result of the masking by said feature point masking unit and the extracted feature points of the second picture; and a picture correction unit configured to correct one of the first picture and the second picture based on the positional relationship calculated by said calculation unit, wherein said masking picture generation unit is configured to generate the masking picture based on angle information calculated based on the edges in the first picture.

8. A picture processing method comprising:

obtaining a first picture and a second picture, the first picture is being taken before the second picture is taken;

extracting feature points from the first picture and feature points from the second picture;

generating a masking picture based on edges in the first picture;

masking the feature points of the first picture extracted in said extracting, with the masking picture generated in said generating;

calculating a positional relationship between the first picture and the second picture based on the feature point specified from the feature points as a result of said masking and the extracted feature points of the second picture; and correcting one of the first picture and the second picture based on the positional relationship calculated in said calculating, wherein said generating comprises generating the masking picture based on angle information calculated based on the edges in the first picture.

9. A non-transitory computer-readable recording medium having a program recorded thereon which causes a computer to execute:

obtaining a first picture and a second picture, the first picture is being taken before the second picture is taken;

extracting feature points from the first picture and feature points from the second picture;

generating a masking picture based on edges in the first picture;

masking the feature points of the first picture extracted in said extracting, with the masking picture generated in said generating;

calculating a positional relationship between the first picture and the second picture based on the feature point specified from the feature points as a result of said masking and the extracted feature points of the second picture; and correcting one of the first picture and the second picture based on the positional relationship calculated in said calculating, wherein said generating comprises generating the masking picture based on angle information calculated based on the edges in the first picture.

* * * * *